(12) United States Patent
Paul et al.

(10) Patent No.: US 9,116,801 B2
(45) Date of Patent: Aug. 25, 2015

(54) REGISTRATION STATUS MANAGEMENT FOR ENDPOINT DEVICES

(75) Inventors: Jeswanth Joel Paul, Denver, CO (US); Thomas Jack Taylor, Arvada, CO (US); Chirag Khandelwal, Denver, CO (US); Kalpa G. Subramanian, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 90 days.

(21) Appl. No.: 13/494,512

(22) Filed: Jun. 12, 2012

(65) Prior Publication Data

US 2013/0332772 A1    Dec. 12, 2013

(51) Int. Cl.
*H04J 1/16* (2006.01)
*G06F 11/07* (2006.01)

(52) U.S. Cl.
CPC .......... *G06F 11/0733* (2013.01); *G06F 11/079* (2013.01)

(58) Field of Classification Search
CPC ........................... G06F 11/0733; G06F 11/079
See application file for complete search history.

(56) References Cited

U.S. PATENT DOCUMENTS

| 7,587,028 | B1 * | 9/2009 | Broerman et al. | 379/15.03 |
| 2002/0169712 | A1 * | 11/2002 | Ginzboorg et al. | 705/39 |
| 2007/0133425 | A1 * | 6/2007 | Chappell | 370/250 |
| 2010/0153787 | A1 * | 6/2010 | Beattie et al. | 714/43 |
| 2010/0217837 | A1 * | 8/2010 | Ansari et al. | 709/218 |
| 2012/0215906 | A1 * | 8/2012 | Mandell | 709/224 |

\* cited by examiner

*Primary Examiner* — Chi H Pham
*Assistant Examiner* — Raul Rivas
(74) *Attorney, Agent, or Firm* — Banner & Witcoff, Ltd.

(57) ABSTRACT

A registration status manager may poll a user device, such as a session initiation protocol (SIP) endpoint device, for a registration state value indicative of its registration state. The registration status manager may receive the registration state value and determine that it indicates a registration state error such as an out-of-service no dial tone (NDT) condition. The registration status manager may determine a possible cause for failure associated with the registration state error. Subsequently, the registration status manager may determine a possible solution associated with the possible cause for failure.

22 Claims, 8 Drawing Sheets

400

| Registration State | Registration State Value |
|---|---|
| DownstreamScanning | 1 |
| DownstreamRanging | 2 |
| UpstreamRanging | 3 |
| DHCP | 4 |
| TFTP | 5 |
| DataRegComplete | 6 |
| telephony-DHCP | 7 |
| telephony-TFTP | 8 |
| telephony-RegWithCallServer | 9 |
| telephony-RegComplete | 10 |

411 — DownstreamScanning
412 — DownstreamRanging
413 — UpstreamRanging
414 — DHCP
415 — TFTP
416 — DataRegComplete
417 — telephony-DHCP
418 — telephony-TFTP
419 — telephony-RegWithCallServer
420 — telephony-RegComplete 401, 402

Out-of-Service No Dial Tone (NDT) Conditions

430

In-Service Dial Tone Condition

FIG. 4

| | Account Number | Telephone Number (TN) | Billing Account Status | Billing TN Status | Modem IP Address | Modem MAC Address | Device MAC Address | Device Registration State | Device Registration State Value |
|---|---|---|---|---|---|---|---|---|---|
| 511 | 012345678901 | 5555551234 | Active | Active | 01.23.456.789 | 01AB23CD45EF | 01:AB:23:CD:45:EG | telephony-RegComplete | 10 |
| 512 | 012345678902 | 5555552345 | Active | Active | 23.45.678.901 | 12AB34CD56EF | 12:AB:34:CD:56:EG | telephony-RegComplete | 10 |
| 513 | 012345678903 | 5555553456 | Active | Active | 34.5.789.012 | 23AB45CD67EF | 23:AB:45:CD:67:E0 | telephony-DHCP | 7 |
| 514 | 012345678904 | 5555554567 | Active | Active | 45.678.789.0 | 01BC23DE45FG | 01:BC:23:DE:45:FH | telephony-RegWithCallServer | 9 |
| 515 | 012345678905 | 5555555678 | Active | Active | 56.78.90.12 | 12BC34DE56FG | 12:BC:34:DE:56:FH | telephony-TFTP | 8 |
| 516 | 012345678906 | 5555556789 | Active | Active | 67.89.01.23 | 23BC45DE67FG | 23:BC:45:DE:67:F0 | telephony-RegWithCallServer | 9 |
| 517 | 012345678907 | 5555557890 | Active | Active | 78.90.123.4 | 01CD23EF45GH | 01:CD:23:EF:45:GI | telephony-TFTP | 8 |
| 518 | 012345678908 | 5555550123 | Active | Pending Install | 89.012.345.678 | 12CD34EF56GH | 12:CD:34:EF:56:GI | telephony-DHCP | 7 |
| 519 | 012345678909 | 5555551245 | Active | Pending Disconnect | 90.12.345.678 | 23CD45EF67GH | 23:CD:45:EF:67:GI | telephony-RegComplete | 10 |
| 520 | 012345678910 | 5555552356 | Inactive | Inactive | 01.23.4.567 | 34CD56EF78GH | 34:CD:56:EF:78:GH | | |

FIG. 5

| Registration State Error Category | Registration State Error Value | Possible Cause for Failure |
|---|---|---|
| telephony-DHCP | 7 | PacketCable side not provisioned |
| telephony-DHCP | 7 | Does not receive DHCP option 122 |
| telephony-TFTP | 8 | Incorrect modem or PacketCable bootfile due to mis-provisioning |
| telephony-TFTP | 8 | DNS issue with trying to resolve the TFTP server FDQN |
| telephony-TFTP | 8 | Routing issue to the TFTP server |
| telephony-TFTP | 8 | Absence of file on TFTP server |
| telephony-RegWithCallServer | 9 | Billing services not activated correctly for the subscriber |

| Registration State Error Category | Registration State Error Value | Possible Cause for Failure | Possible Solution |
|---|---|---|---|
| telephony-DHCP | 7 | PacketCable side not provisioned | Re-provision and reset the device |
| telephony-DHCP | 7 | Does not receive DHCP option 122 | Re-provision and reset the device |
| telephony-TFTP | 8 | Incorrect modem or PacketCable bootfile due to mis-provisioning | Correct bootfile, routing or check file on the TFTP server |
| telephony-TFTP | 8 | DNS issue with trying to resolve the TFTP server FDQN | Correct bootfile, routing or check file on the TFTP server |
| telephony-TFTP | 8 | Routing issue to the TFTP server | Correct bootfile, routing or check file on the TFTP server |
| telephony-TFTP | 8 | Absence of file on TFTP server | Correct bootfile, routing or check file on the TFTP server |
| telephony-RegWithCallServer | 9 | Billing services not activated correctly for the subscriber | Activate correctly in billing and reset the device |

FIG. 7

REGISTRATION STATUS MANAGEMENT FOR ENDPOINT DEVICES

BACKGROUND

System operators and content providers typically provide high-speed Internet services and Voice over Internet Protocol (VoIP) telephony services through a single transmission system. Accordingly, telephony devices such as embedded digital voice adapters (eDVAs) must complete and pass various stages of registration to achieve dial tone. However, devices may lose dial tone for various reasons at any given point in time.

One solution is to have a human service agent troubleshoot and fix an out-of-service device once a user calls in and reports a problem. However, this approach may result in a long downtime for the user and, in some instances, an unacceptably high Mean Time to Repair (MTTR). As a result, the user's experience may be negatively impacted while he or she waits for the human service agent to restore dial tone to the device.

SUMMARY

Some features described herein relate generally to a system that implements a registration status management automation technique for determining whether a telephony device has a dial tone when using Session Initiation Protocol (SIP) and, if a device does not have a dial tone, fixing or otherwise setting up the device so that it may have a dial tone.

In some embodiments, a computing device may poll a user device, such as an SIP endpoint device on an IP Multimedia Subsystem (IMS) network, for its registration state value. The registration state value may be a numeric value indicative of the current registration state of the device. In some instances, the computing device may poll the user device by transmitting a request for the registration state value, such as, for example, an SNMPWALK request and an SNMPGET request.

In some embodiments, the computing device may determine that the received registration state value indicates a registration state error, such as an out-of-service no dial tone (NDT) condition. The computing device may determine a possible cause for failure associated with the registration state error. For example, the computing device may determine that there is a one-to-one correlation between the registration state value and a particular registration state error value. The computing device may determine the possible cause for failure based on a registration state error category associated with the registration state error value. In some arrangements, registration error values may be stored in association with respective registration state error categories in a storage device such as a library of registration state errors.

In some embodiments, the computing device may then determine a possible solution associated with the possible cause for failure. For example, the computing device may access a storage device, such as a library of registration state error solutions, to identify a possible solution stored in association with the possible cause for failure, the registration state error category, or the registration state error value.

In some embodiments, the computing device may execute instructions associated with the possible solution to attempt to correct the registration state error. In some instances, if the executed instructions are successful in correcting the registration state error and bringing the user device to an in-service dial tone condition, the computing device may update the library of registration state error solutions to indicate that the determined possible solution is successful in correcting the determined possible cause for failure. In some instances, the computing device may transmit a message (e.g., text data, image data, audio data, video data) indicative of the possible solution to a user such as a fix agent for use in correcting the registration state error.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 4 illustrates example registration state information.

FIG. 5 illustrates example registration status information for a plurality of devices.

FIG. 6 illustrates example registration state error information.

FIG. 7 illustrates example registration state solution information.

DETAILED DESCRIPTION

Figure 1:
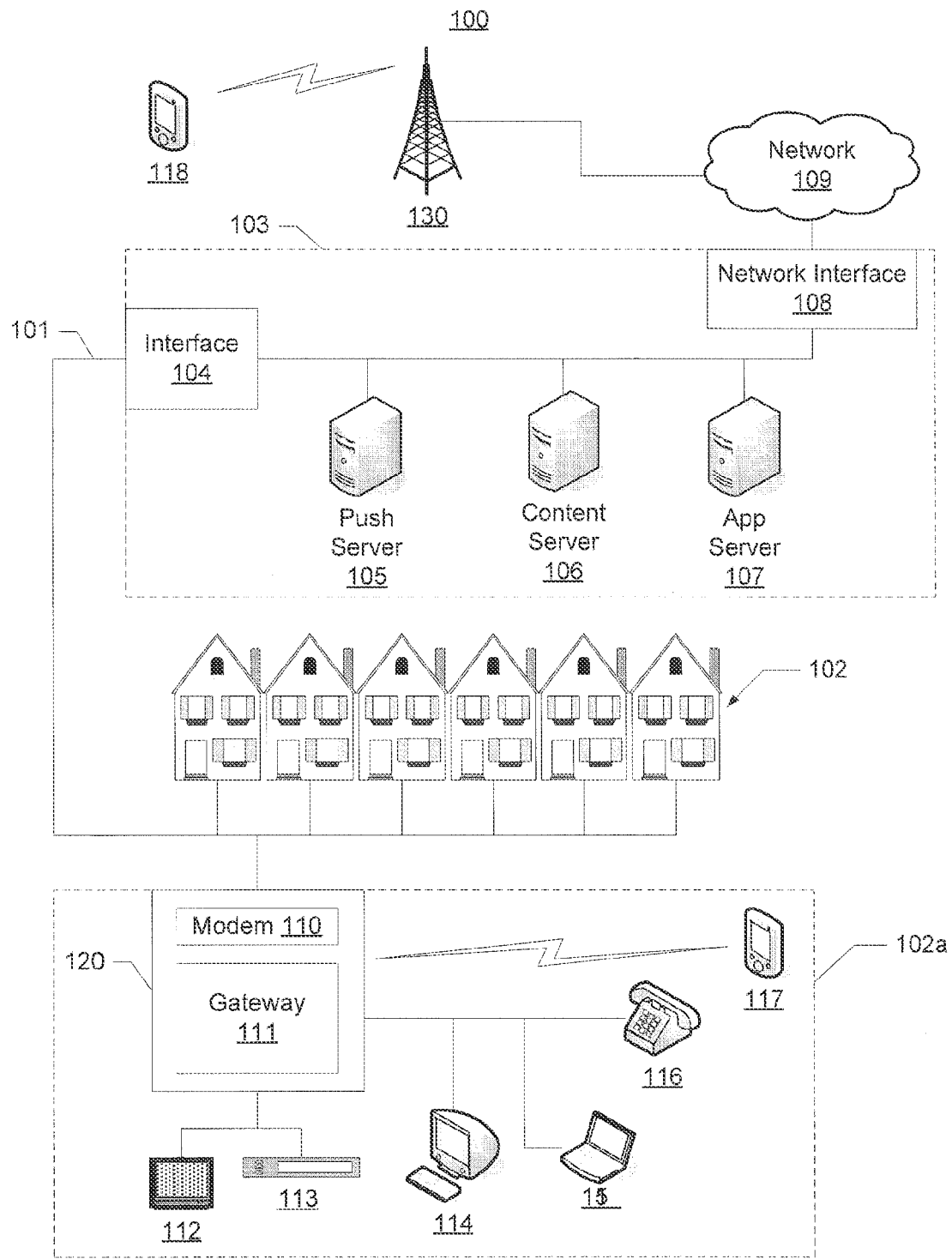
FIG. 1 illustrates an example network environment.

FIG. 1 illustrates an example information distribution network 100 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other type of data access or distribution network or combination of networks. In one example, network 100 may be a digital voice network communicating with multiple session initiation protocol (SIP) endpoint devices, such as SIP endpoint device 116 in example premise 102a (e.g., a home, a business, an institution, etc.). In another example, network 100 may be a cellular broadband network communicating with multiple communications access points, such as wireless communications tower 130, to provide communication signals to devices such as wireless device 118 (e.g., a mobile phone, a wireless laptop, a tablet computer, a portable gaming device). In another example, network 100 may be a coaxial system comprising a modem termination system (e.g., a cable mode termination system (CMTS)) communicating with numerous gateway interface devices (e.g., gateway interface device 111 in example premise 102a). In another example, the network 100 may be a fiber-optic system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's premise. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as premises 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, internet data, voice data, weather data, media content, and any other information. Media content may include, for example, video content, audio content, media on demand, video on demand, streaming video, television programs, text listings, graphics, advertisements, and other content.

Local office 103 may transmit downstream information signals onto communication links 101, and premises such as premises 102 may receive and process those signals. In certain implementations, communication links 101 may originate from local office 103 as a single communications path, and may be split into any number of communication links to distribute data to premises 102 and various other destinations. Although the term premise is used by way of example, premises 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in premises 102 (e.g., homes, businesses, institutions, etc.), and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may include one or more application servers 107.

Premises 102 such as premise 102a may include an interface 120, which may include modem device 110, for communicating on communication links 101 with local office 103, one or more external networks 109, or both. For example, modem device 110 may be a coaxial cable modem (for coaxial cable links 101), a broadband modem (for DSL links 101), a fiber interface node (for fiber-optic links 101), or any other device or combination of devices. In another example, modem device 110 may be an embedded multimedia terminal adapter (eMTA) comprising a cable modem and a multimedia adapter (MTA), such as a Voice over IP (VoIP) adapter. In certain implementations, modem device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with modem device 110 to allow one or more other devices in example premise 102a to communicate with local office 103, one or more external networks 109, or other devices communicatively coupled thereto. Gateway 111 may include local network interfaces to provide communication signals to client devices in or near example premise 102a, such as television 112, set-top box 113, personal computer 114, laptop computer 115, SIP endpoint device 116, wireless device 117 (e.g., a wireless laptop, a tablet computer, a mobile phone, a portable gaming device), a vehicular computing system (e.g., a mobile computing system, navigation system, or entertainment system in an automobile, marine vessel, or aircraft) and any other device.

Figure 2:
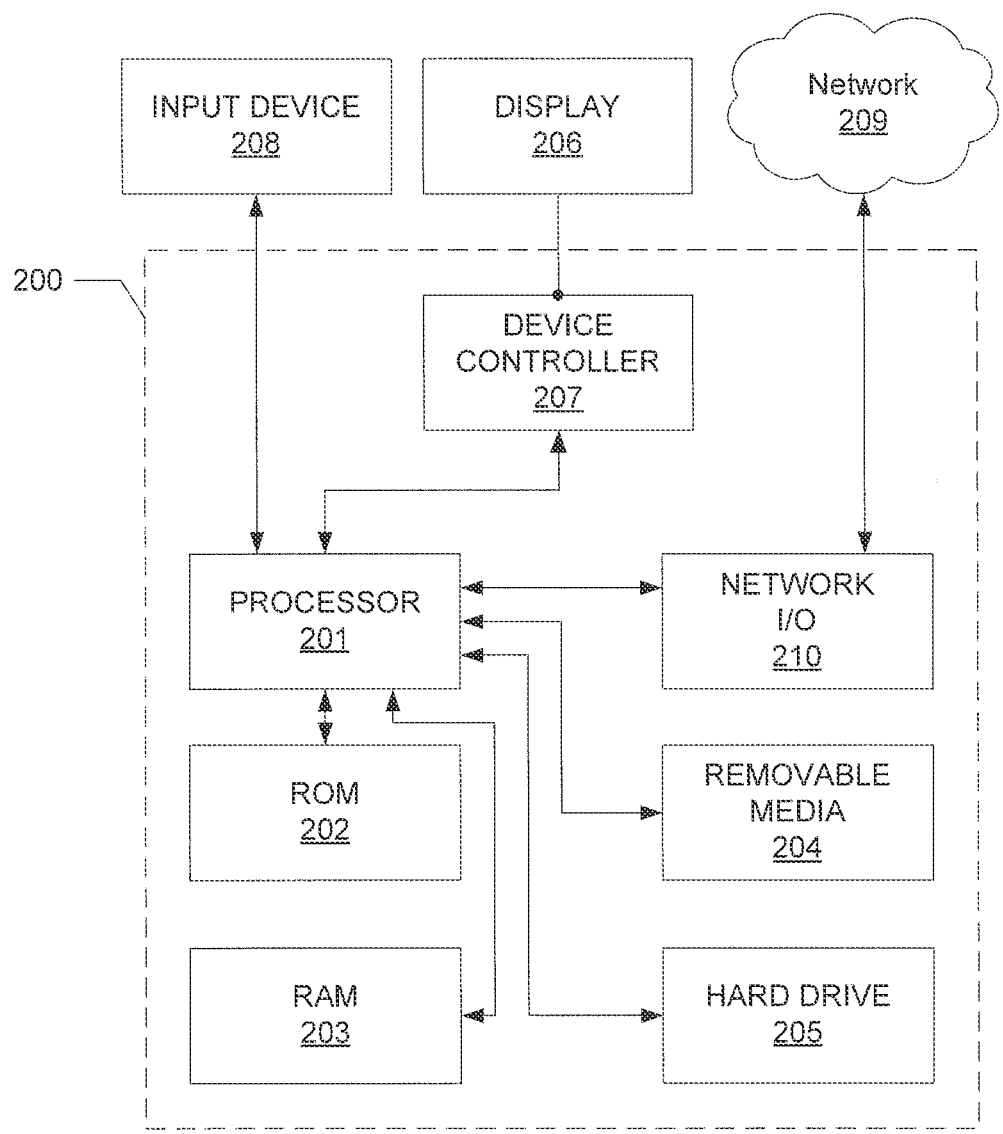
FIG. 2 illustrates an example computing device on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206 (e.g., external monitor, television), and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101, one or more external networks 109, an in-premise network, a provider's wireless, coaxial, fiber, or hybrid fiber/coaxial distribution system (e.g., a DOCSIS network), or any other desired network.

Figure 3:
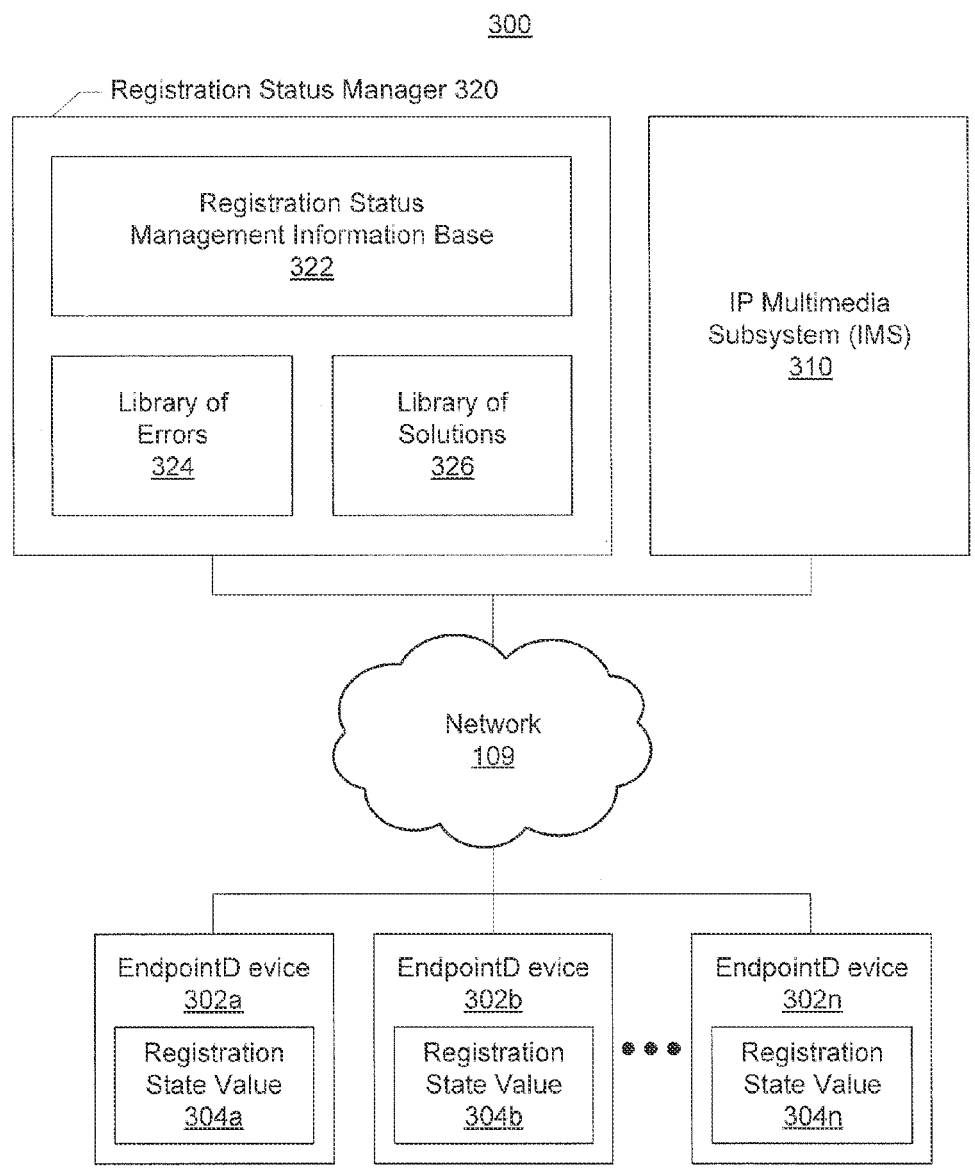
FIG. 3 illustrates an example system for providing registration status management automation.

FIG. 3 illustrates an example system 300 for providing registration status management automation. In one aspect, system 300 may be used to correct out-of-service no dial tone (NDT) conditions on session initiation protocol (SIP) endpoint devices, such as embedded digital voice adapter (eDVA) devices (e.g., "phones" on an IMS network). The various features shown in FIG. 3 may be implemented using hardware, software, or both, such as device 200, and may be communicatively coupled through one or more communications networks, such as one or more external networks 109, via a respective router using any communications links, such as communications links 101. For example, IP Multimedia Subsystem (IMS) 310 and registration status manager 320 may be communicatively coupled to one or more external networks 109, and endpoint devices 302a-n may each be an SIP endpoint device such as device 116 located in premise 102a and communicatively coupled to one or more external networks 109 through local office 103.

In one or more arrangements, system 300 may support a digital voice network by digitizing voice communications and transmitting data over network 109. A digital voice network may be supported by, for example, network 100, and may be accessible by users such as subscribers to a service provider or non-subscribing users. In some instances, the components in system 300 may be communicatively coupled to a Domain Name System (DNS) server, a Dynamic Host Configuration Protocol (DHCP) server, a Trivial File Transfer Protocol (TFTP) server, or any other server or combination of servers through network 109 for providing one or more of the features described herein.

System 300 may include one or more endpoint devices 302a-n, IP Multimedia Subsystem (IMS) 310, and registration status manager 320. Endpoint devices 302a-n may include any SIP endpoint devices or eDVA devices (e.g., device 116), and may be coupled to network 109 through a termination system (e.g., interface 104). For example, each of endpoint devices 302a-n may be may be an SIP phone capable of transmitting and receiving voice and video communications data, such as phone calls and video chats. In an illustrative example, endpoint devices 302a-n may include devices associated with users of a digital voice service provided by a service provider.

Endpoint devices 302a-n may be configured to store respective registration state values 304a-n. Registration state values 304a-n may be, for example, numerical or other values respectively indicative of each of endpoint devices 302's registration status (e.g., dial tone, no dial tone). In one example, registration state values may include a series of integer values ranging from "1" to "10" mapped to a particular protocol, such as to DOCSIS and telephony registration states, where values of "1" through "6" correspond to DOCSIS registration states and values of "7" through "10" correspond to telephony registration states. In certain implementations, registration state values 304a-n may be programmed into an SIP protocol stack of an eDVA code stored in endpoint devices 302a-n. Registration state information (e.g., registration states and registration state values) will be discussed in further detail with reference to FIG. 4.

Internet Protocol (IP) Multimedia Subsystem (IMS) 310 may be configured to manage the operations of and services offered by a service provider over a digital voice network supported by network 109. IMS 310 may provide various services and features to endpoint devices 302, such as voice communications, voicemail, call forwarding, call waiting, caller identification (ID) and video chat. In one example, IMS 310 or another server or system may direct voice mail messages to a voice mail server if a device called by one of endpoint devices 302 is not currently available (e.g., line is busy, no answer, etc.). In another example, IMS 310 may interact with an IMS feature server to control connection services, select processes or services that may be applied to a call, and provide routing within a network such as network 109. In some instances, IMS 310 may interface with a public switched telephone network (PSTN) for communicating with public switched telephone devices.

Registration status manager 320 may be a computing device that includes hardware and/or software for identifying and correcting registration state errors (e.g., out-of-service NDT conditions) on endpoint devices 302, thereby providing service (e.g., dial tone) to users or subscribers respectively associated with those devices. Registration status manager 320 may be implemented using, for example, one or more computing devices such as application servers, database servers, or other devices or combinations of devices. In one example, registration status manager 320 may be partially or wholly included in an application point of presence (APOP) data center. In some embodiments, registration status manager 320 may include one or more processors and memory that includes computer executable instructions (e.g., coded in the Ruby programming language) and other information that, when executed by the one or more processors, perform the features of the present disclosure.

Registration status manager 320 may include, for example, registration status management information base (MIB) 322, library of registration state errors 324, library of registration state error solutions 326, and other computing devices for providing registration status management automation. For example, if it is determined that device 302a is stuck in an out-of-service NDT condition based on its registration state value, registration status manager 320 may process information associated with device 302a's registration status value 304a based on a series of techniques implemented using registration status MIB 322, errors library 324 and solutions library 326 for use in bringing device 302a to an in-service dial tone condition.

Registration status MIB 322 may be, for example, a storage device or database for managing the registration statuses of endpoint devices 302. Registration status MIB 322 may include, for example, user information, address information and registration status information. User information may include, for example, billing information, account numbers, (PSTN) telephone numbers, e-mail addresses, subscription information, subscription levels, subscription statuses, user preferences, and other information respectively associated with the users or subscribers of endpoint devices 302. Address information may include, for example, unique identifiers (UIDs) such as internet protocol (IP) addresses, media access control (MAC) addresses, fully qualified domain names (FQDNs), international mobile subscriber identity (IMSI) numbers, and other information respectively associated with endpoint devices 302. Registration status information may include, for example, information associated with the registration states of endpoint devices 302, such as respective registration state values and the dates and times at which they were stored, transmitted, or received. Registration status MIB 322 and examples of information stored therein will be described in further detail with reference to FIG. 5.

Library of registration state errors 324 may be, for example, a storage device or database for use in identifying registration state errors associated with the registration state values 304 received from endpoint devices 302. Errors library 324 may include, for example, registration state error information such as registration state error values, registration state error categories, possible causes for failure, and other information respectively associated with various registration state errors. Errors library 324 and examples of information stored therein will be described in further detail with reference to FIG. 6.

Library of registration state error solutions 326 may be, for example, a storage device or database for use in determining solutions to particular registration state errors or error categories stored in errors library 324. Solutions library 326 may include, for example, registration state error solution information such as possible solutions to the possible causes for failure associated with various registration state errors. For example, each registration state error category may be associated with a specific set of computer executable instructions for use by registration status manager 320 and, in some instances, other instructions (e.g., text, images, audio, videos) for use by users such as fix agents. Solutions library 326 and examples of information stored therein will be described in further detail with reference to FIG. 7.

In some embodiments, registration status manager 320 may perform registration status management automation by monitoring the registration states and availabilities of each of endpoint devices 302. For example, registration status manager 320 may poll endpoint devices 302 for their registration state values 304 by transmitting, using Simple Mail Transfer Protocol (SNMP), an SNMPWALK request and an SNMPGET request to each of endpoint devices 302 requesting that they perform a SNMPWALK/SNMPGET procedure against their respective registration state values 304. In certain implementations, registration status manager 320 may poll endpoint devices 302 using Hypertext Transfer Protocol (HTTP) commands or data transmissions associated with any other protocol. In response to the transmission, each of endpoint devices 302 may transmit their respective registration state value 304 to registration status manager 320 or an intermediate computing device communicatively coupled to registration status manager 320. Registration status manager 320 may receive the registration state values 304 and store them in a storage device such as registration status MIB 322.

In some embodiments, registration status manager 320 may determine registration state errors for devices in an out-of-service NDT condition based on the received registration state values. For example, registration status manager 320 may determine that one or more of the received registration state values are associated with a registration state error by, for example, determining that the one or more received registration state values are not indicative of an in-service dial tone condition. In an example of DOCSIS and PacketCable telephony registration states with values ranging from "1" to "10," where the value of "10" corresponds to an in-service dial tone condition, endpoint devices with registration state values of "1" through "9" may be identified as having registration state errors because, in some instances, they may be stuck in an out-of-service NDT condition.

In some embodiments, registration status manager 320 may identify registration state error categories and determine possible causes for failure associated with the identified registration state errors. In an example, registration status manager 320 may determine whether a registration state value is associated with a registration state error value indicative of a particular registration state error category stored in errors library 324 based on, for example, a one-to-one correlation or mapping. For example, registration status manager 320 may determine that registration state values of "7," "8," and "9" correlate to registration state error values of "7," "8," and "9," respectively, which may be respectively associated with the error categories of "telephony-DHCP," "telephony-TFTP," and "telephony-RegWithCallServer."

In some embodiments, registration status manager 320 may determine a possible cause for failure from among multiple possible causes for failure. In an example, registration status manager 320 may determine that registration state value 304a correlates to multiple possible causes for failure and determine a particular possible cause for failure based on account information (e.g., service levels, software, firmware, etc.) associated with endpoint device 302a. For example, registration status manager 320 may receive account information associated with device 302a and reset device 302a or perform a predetermined action that might help initiate a fix based on, for example, a service level associated with device 302a, such as a subscription to a high or low bandwidth service. In another example, registration status manager 320 may perform a predetermined action that might help initiate a fix based on the particular software or firmware stored in device 302a. For example, a firmware version stored in device 302a may have a known possible cause for failure and may be associated with a known solution for fixing registration state errors that may result from the known possible cause for failure.

In some embodiments, registration status manager 320 may determine possible solutions associated with the determined possible causes for failure for use in correcting the registration state errors. For example, registration status manager 320 may determine whether a determined registration state error value or category correlates with a possible solution stored in solutions library 326 based on, for example, a one-to-one correlation or mapping. For example, registration status manager 320 may determine that registration state error values of "7," "8," and "9" correlate to the possible solutions "re-provision and reset the device," "correct bootfile, routing or check file on the TFTP server," and "activate correctly in billing and reset the device," respectively.

In some embodiments, registration status manager 320 may process the determined possible solutions for use in correcting the registration state errors. For example, registration status manager 320 may execute instructions associated with a possible solution (e.g., "re-provision and reset the device") to attempt to correct one or more devices associated with a common registration state error category. If the possible solution is successful in transitioning a device to an in-service dial tone condition, registration status manager 320 may update solutions library 326 to indicate that the solution was successful. If the possible solution is not successful in correcting the registration state error, registration status manager 320 may transmit a message including instructions (e.g., text, images, audio, video) to a fix agent for further remediation or troubleshooting. In certain implementations, if the fix agent identifies a possible solution or determines a solution that is successful in correcting the registration state error, the fix agent may update solutions library 326 with computer executable instructions corresponding to the possible solution or the successful solution using an input device such as input device 208.

In some embodiments, registration status manager 320 may provide the ability to monitor for trends and root causes of registration state errors. Registration status manager 320 may also build a report for future use so that the root cause of the registration state errors can be addressed. For example, after identifying the specific registration state errors associated with each of endpoint devices 302, registration status manager 320 may generate a report, such as a comma-separated values (csv) file or a spreadsheet file, that groups the devices into defined registration state error categories. Registration status manager 320 may store the report in registration status MIB 322 for use in applying common solutions to devices stuck in common registration state errors or for use in identifying larger systemic problems. In certain implementations, registration status manager 320 may update the report by performing the registration status management automation at a predetermined or regularly scheduled interval (e.g., once a day, every two seconds, etc.), or on-demand for as-needed fixes. In some instances, the report may be used in a root cause analysis for determining the possible causes for failure associated with the registration state errors.

FIG. 4 illustrates example registration state information 400 that may be stored in an SIP endpoint device (e.g., endpoint device 302) as it transitions through various stages of registration to achieve dial tone. As shown in FIG. 4, each registration state may be respectively associated with a registration state description in field 401 and a registration state value in field 402.

Registration states, which, in one embodiment, are DOCSIS registration states 411 (e.g., "docsis-DownstreamScanning" having a registration state value of "1"), 412 (e.g., "docsis-DownstreamRanging" having a registration state value of "2"), 413 (e.g., "docsis-UpstreamRanging" having a registration state value of "3"), 414 (e.g., "docsis-DHCP" having a registration state value of "4"), 415 (e.g., "docsis-TFTP" having a registration state value of "5") and 416 (e.g., "doscis-DataRegComplete" having a registration state value of "6") may correspond to DOCSIS registration states. An SIP endpoint device 302 may progress through registration states 411, 412, 413, 414, 415 and 416 after connecting to the radio frequency (RF) interface of the cable modem termination system (e.g., interface 104).

Registration states 417 (e.g., "telephony-DHCP" having a registration state value of "7"), 418 (e.g., "telephony-TFTP" having a registration state value of "8"), 419 (e.g., "telephony-RegWithCallServer" having a registration state value of "9") and 420 (e.g., "telephony-RegComplete" having a registration state value of "10") may correspond to telephony registration states. The endpoint device may progress through registration states 417, 418, 419, and 420 as it registers with an IMS core (e.g., IMS 301) to achieve dial tone. For example, after completing DOCSIS registration in registration state 416, the endpoint device may complete registration with the DHCP server in registration state 417, receive files from the TFTP server in registration state 418, and register with the IMS core in registration states 419 and 420 to achieve dial tone.

As shown in FIG. 4, registration state values beyond a threshold value, such as threshold value 430, may correspond to registration state errors. For example, registration states 411, 412, 413, 414, 415, 416, 417, 418 and 419 having registration state values less than or equal to a predetermined threshold value 430 of "9" may correspond to SIP endpoint devices having out-of-service NDT conditions. Registration state 420 having a registration state value greater than the predetermined threshold value 430 of "9" may correspond to SIP endpoint devices having an in-service dial tone condition (e.g., the device may be fully registered and may have dial tone).

FIG. 5 illustrates example information 500 for a plurality of SIP endpoint devices (e.g., endpoint devices 302). Information 500 may be stored in, for example, a registration status MIB (e.g., MIB 322). In some arrangements, information 500 may be included in a user interface displayed on device 200 using, for example, display 206.

Information 500 may include user information, address information and registration status information for respective devices in, for example, rows 511-520 or in any other suitable field, grouping, data structure, or combination thereof. Information 500 may include, for example, user information in fields 501 (e.g., "Account Number"), 502 (e.g., "Telephone Number (TN)"), 503 (e.g., "Billing Account Status") and 504 (e.g., "Billing TN Status").

Information 500 may include, for example, address information in fields 505 (e.g., "Cable Modem IP address"), 506 (e.g., "Cable Modem MAC Address") and 507 (e.g., "Device MAC Address"). It will be understood that the term "Cable Modem" is used by way of illustration and not of limitation and may correspond to any device communicatively coupled between the device and a termination system (e.g., interface 104), such as interface 120 or device.

Information 500 may include, for example, registration status information in fields 508 (e.g., "Device Registration State") and 509 (e.g., "Device Registration State Value"), which may include the features described with reference to fields 401 and 402, respectively.

In one illustrative example, the registration status manager may receive the user information in fields 501, 502, 503 and 504 in response to accessing a billing database maintained by a service provider. The registration status manager may compare information associated with all devices on the IMS network against the user information and, in some instances, only poll those devices having "Active" billing TN statuses in field 504 (e.g., rows 511-519) for their respective registration status values. The registration status manager may perform no action for devices having "Inactive" billing TN statuses in field 504 (e.g., row 520). The registration status manager may then filter information 500 to identify any devices having registration status values in field 509 not equal to "10" (e.g., rows 513-518) and apply the corresponding solution codes (e.g., instructions stored in solutions library 326) to attempt to fix the devices' out-of-service NDT conditions.

FIG. 6 illustrates example information 600 for use in identifying registration state errors associated with registration state information (e.g., information in fields 508 and 509) received from an SIP endpoint device. Information 600 may be stored in, for example, a library of registration state errors (e.g., errors library 324). In some arrangements, information 600 may be included in a user interface displayed on device 200 using, for example, display 206. In some arrangements, the one or more possible causes for failure may be determined by the registration status manager, input by a user using an input device such as input device 208, or both.

As shown in FIG. 6, each registration state error may be respectively associated with a registration state error category in field 601, a registration state error value in field 602, and one or more possible causes for failure in field 603. For purposes of illustration and not of limitation, the disclosure will focus on out-of-service NDT conditions corresponding to telephony registration states 417, 418 and 419.

In some embodiments, an SIP endpoint device may fail the telephony registration process (e.g., registration states 417-420) due to a variety of factors, such as incorrect bootfile, incorrect provisioning, incorrect activation method, routing issues do to the TFTP servers, DNS issues, DHCP pool exhaustion (e.g., running out of IP addresses causing the device to be stuck in DHCP), unavailability of a network path (e.g., failure of a communications link), or IMS core issues.

For example, as shown in rows 611 and 612, the registration state error category "telephony-DHCP" having the registration state error value "7" may be associated with two possible causes for failure, "PacketCable side not provisioned" and "Does not receive DHCP option 122," respectively. In another example, as shown in rows 613, 614, 615 and 616, the registration state error category "telephony-TFTP" having the registration state error value "8" may be associated with four possible causes for failure, "Incorrect cable modem or PacketCable bootfile due to mis-provisioning," "DNS issue with trying to resolve the TFTP server FDQN," "Routing issue to the TFTP server" and "Absence of file on TFTP server," respectively. In another example, as shown in row 617, the registration state error category "telephony-RegWithCallServer" having the registration state error value "9" may be associated with the possible causes for failure "Billing services not activated correctly for the subscriber."

FIG. 7 illustrates example information 700 for use in determining possible registration state error solutions associated with registration state error information (e.g., information in fields 601, 602 and 603). Information 700 may be stored in, for example, a library of registration state error solutions (e.g., solutions library 326). In some embodiments, fields 701, 702 and 703 may include the features described with reference to fields 601, 602, and 603, respectively. In some arrangements, information 700 may be included in a user interface displayed on device 200 using, for example, display 206. In some arrangements, the one or more possible solutions may be determined by the registration status manager, input by a user using an input device such as input device 208, or both.

As shown in FIG. 7, each registration state error category may be respectively associated with one or more possible solutions in field 704. For example, as shown in rows 711 and 712, the registration state error category "telephony-DHCP" having the registration state error value "7" may be associated with computer executable instructions and other instructions (e.g., text data, image data, audio data, video data for use by fix agents) for performing the possible solution "Re-provision and reset the device." In another example, as shown in rows 713, 714, 715 and 716, the registration state error category "telephony-TFTP" having the registration state error value "8" may be associated with computer executable instructions and other instructions for performing the possible solution "Correct bootfile, routing or check file on the TFTP server." In another example, as shown in row 717, the registration state error category "telephony-RegWithCallServer" having the registration state error value "9" may be associated with computer executable instructions and other instructions for performing the possible solution "Activate correctly in billing and reset the device."

Figure 8:
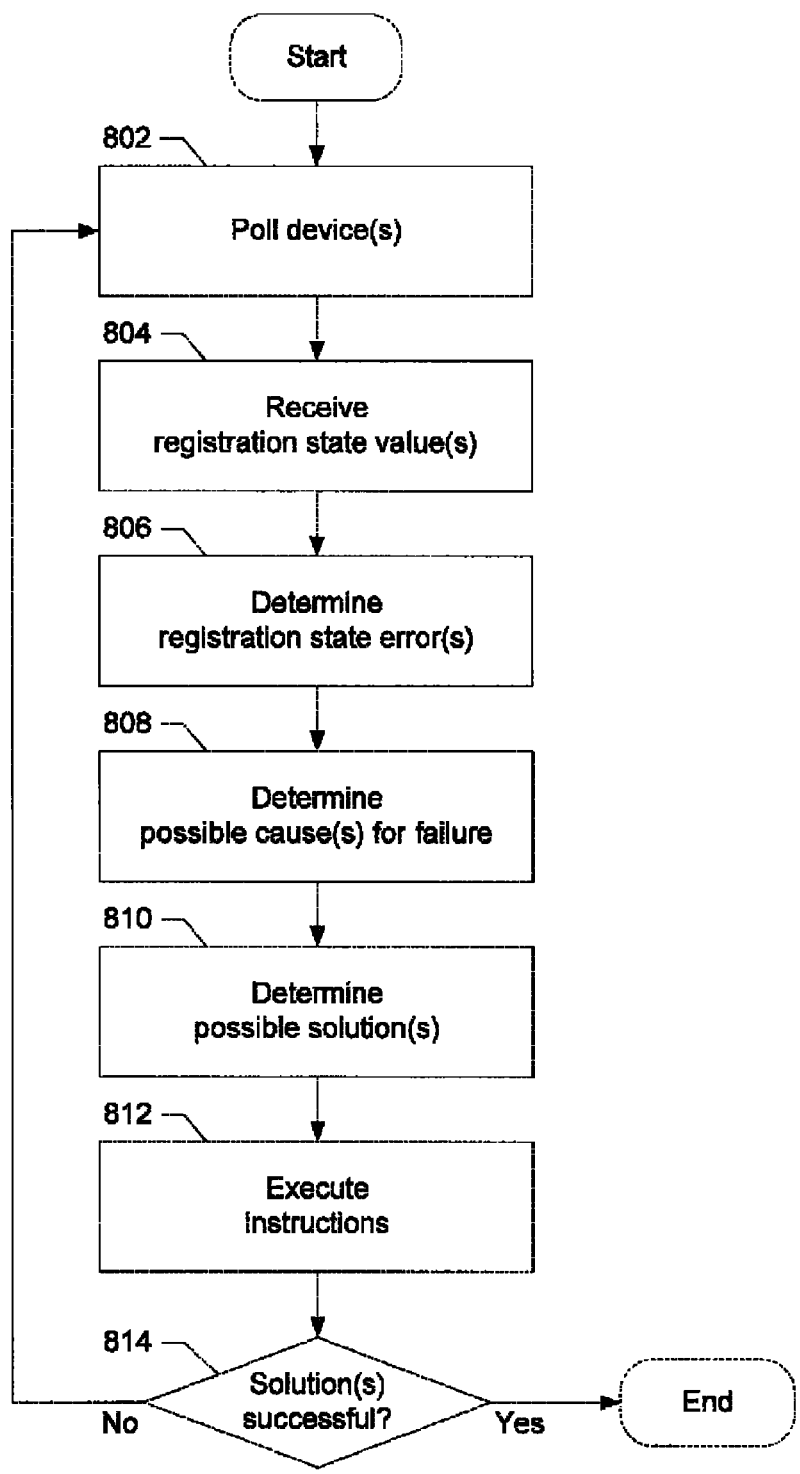
FIG. 8 illustrates an example process flow for providing registration status management automation.

FIG. 8 illustrates an example process flow for providing registration status management automation.

At step 802, a registration status manager (e.g., registration status manager 320) polls one or more SIP endpoint devices (e.g., endpoint devices 302a-n) for their registration state values (e.g., values 304a-n). For example, the registration status manager may transmit an SNMPWALK request and an SNMPGET request to each of the one or more endpoint devices requesting that they perform a SNMPWALK/SNMPGET procedure against their respective registration state values. Each device's registration state value may be, for example, a numerical value indicative of its current state, e.g., its DOCSIS or telephony registration state as discussed with reference to FIG. 4.

At step 804, the registration status manager receives the one or more registration state values associated with the one or more polled devices. In certain implementations, the registration status manager may store the received one or more registration state values in a registration status MIB (e.g., MIB 322).

At step 806, the registration status manager determines one or more registration state errors based on the one or more registration state values. For example, the registration status manager may determine that one or more of the received registration state values are indicative of a registration state error if they are not indicative of an in-service dial tone condition as discussed with reference to FIG. 3 and FIG. 4.

At step 808, the registration status manager determines one or more possible causes for failure respectively associated with the one or more registration state errors. For example, the registration status manager may determine that one or more of the received registration state values are associated with one or more registration state error categories and possible causes for failure stored in a storage device (e.g., errors library 324) as discussed with reference to FIG. 3 and FIG. 6.

At step 810, the registration status manager determines one or more possible solutions respectively associated with the one or more possible causes for failure. For example, the registration status manager may determine that the one or more of the possible causes for failure, or error categories associated with the possible causes for failure, are associated with one or more possible solutions stored in a storage device (e.g., solutions library 326) as discussed with reference to FIG. 3 and FIG. 7.

At step 812, the registration status manager executes instructions respectively associated with the one or more possible solutions to attempt to correct the registration state error. For example, the registration status manager may execute instructions stored in a storage device (e.g., solutions library 326) and associated with a possible solution to attempt correct one or more devices associated with a common possible cause for failure or registration state error category as discussed with reference to FIG. 3 and FIG. 7.

At step 814, the registration status manager determines whether the executed instructions are successful in correcting the one or more registration state errors. For example, the registration status manager may determine that the executed instructions are successful in correcting a registration state error if the executed instructions are successful in transitioning a device stuck in an out-of-service NDT condition to an in-service dial tone condition as discussed with reference to FIG. 3. If the executed instructions are successful in correcting the one or more registration state errors, the process may end because the one or more registration state errors have been corrected. If the executed instructions are not successful in correcting the one or more registration state errors, the process may return to step 802 and repeat because there is at least one registration state error to correct.

With the features described above, various advantages may be achieved. One advantage that may be achieved with the present technique is that the amount of customer service calls from subscribers may decrease as a result of polling for and correcting out-of-service devices before they are noticed by the subscribers. Accordingly, operational costs to the service provider may decrease and, in some instances, subscriber satisfaction and positive user experience may increase.

The various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method comprising:
    transmitting, by a computing device to a user device, a request for a registration state value;
    receiving the registration state value in response to the request;
    determining a registration state error value based on a correspondence between the registration state value and the registration state error value of a plurality of registration state error values, wherein each of the plurality of registration state error values is associated with one of a plurality of different values indicating an out-of-service no dial tone condition;
    determining a registration state error category associated with the registration state error value, wherein the registration state error category is one of a plurality of registration state error categories each corresponding to one or more possible causes for the out-of-service no dial tone condition and one or more respectively associated possible solutions;
    determining a possible cause for the out-of-service no dial tone condition from the one or more possible causes for the out-of service no dial tone condition associated with the registration state error category; and
    determining a possible solution associated with the possible cause for the out-of-service no dial tone condition.

2. The method of claim 1, wherein the user device comprises a session initiation protocol endpoint device.

3. The method of claim 1, wherein the request comprises one or more of an SNMPWALK request and an SNMPGET request.

4. The method of claim 3, wherein the plurality of registration state error categories comprises at least one Data Over Cable Service Interface Specification (DOCSIS) registration state error category and a plurality of telephony registration state error categories.

5. The method of claim 1, wherein the determining the possible cause for the out-of-service no dial tone condition from the one or more possible causes for the out-of service no dial tone condition is based on account information associated with the user device.

6. The method of claim 1, further comprising:
    executing instructions associated with the possible solution to attempt to correct the out-of-service no dial tone condition.

7. The method of claim 6, further comprising:
    receiving data indicating that the possible solution was one of successful and not successful in correcting the out-of-service no dial tone condition; and
    updating a library of possible solutions based on the received data.

8. The method of claim 1, further comprising:
    transmitting, by the computing device, to a computing device associated with a fix agent, a message indicative of the possible solution,
    wherein the message comprises one or more of text data, image data, audio data, and video data.

9. A method comprising:
    transmitting, to a plurality of user devices, one or more requests for registration state values respectively associated with the plurality of user devices;
    receiving the registration state values in response to the one or more requests, wherein each of the received registration state values comprises one of a Data Over Cable Service Interface Specification (DOCSIS) registration state value or a telephony registration state value;
    determining registration state error values based on a correspondence between the registration state values and the registration state error values, wherein each registration state error value is associated with one of a plurality of different values indicating an out-of-service no dial tone condition;
    determining registration state error categories respectively associated with the registration state error values;
    determining one or more possible causes for the out-of-service no dial tone condition respectively associated with each of the registration state error categories;
    determining one or more possible solutions respectively associated with the one or more possible causes for the out-of-service no dial tone condition; and
    executing instructions associated with the one or more possible solutions to attempt to correct the out-of-service no dial tone condition.

10. The method of claim 9, wherein the plurality of user devices is communicatively coupled to an IP multimedia subsystem.

11. The method of claim 9, wherein the one or more requests comprise one or more of an SNMPWALK request and an SNMPGET request.

12. The method of claim 9, further comprising:
    determining a first subset of the plurality of user devices collectively associated with a first registration state error value indicative of the out-of-service no dial tone condition;
    determining a second subset of the plurality of user devices collectively associated with a second registration state error value indicative of the out-of-service no dial tone condition;
    determining a first possible cause for the out-of-service no dial tone condition associated with the first registration state error value;
    determining a second possible cause for the out-of-service no dial tone condition associated with the second registration state error value, wherein the first possible cause for the out-of-service no dial tone condition is different from the second possible cause for the out-of-service no dial tone condition;
    determining a first possible solution based on the first possible cause for the out-of-service no dial tone condition;
    determining a second possible solution based on the second possible cause for the out-of-service no dial tone condition;
    executing instructions associated with the first possible solution to attempt to correct the out-of-service no dial tone condition; and
    executing instructions associated with the second possible solution to attempt to correct the out-of-service no dial tone condition.

13. The method of claim 9, further comprising:
    receiving address information respectively associated with each of the plurality of user devices;
    generating a report comprising the address information in respective association with the registration state error values, the determined one or more possible causes for the out-of-service no dial tone condition, and the determined one or more possible solutions; and
    storing the generated report in an information base.

14. The method of claim 12, further comprising:
    determining whether the executed instructions associated with the first possible solution are successful in correcting the out-of-service no dial tone condition.

15. The method of claim 14, further comprising:
in response to determining that the executed instructions associated with the first possible solution are successful in correcting the out-of-service no dial tone condition, updating a library of possible solutions to indicate that the first possible solution is successful in correcting the out-of-service no dial tone condition.

16. The method of claim 9, further comprising:
in response to determining that the executed instructions are not successful in correcting the out-of-service no dial tone condition, transmitting a message to a computing device associated with a fix agent,
wherein the message comprises one or more of text data, image data, audio data, and video data.

17. A non-transitory computer readable storage medium storing computer readable instructions which, when read by a computer, instruct the computer to:
transmit, to a user device, a request for a registration state value associated with the user device;
receive the registration state value in response to the request, wherein the received registration state value comprises one of a Data Over Cable Service Interface Specification (DOCSIS) registration state value or a telephony registration state value;
determine a registration state error value based on a correspondence between the registration state value and the registration state error value of a plurality of registration state error values, wherein each of the plurality of registration state error values is associated with one of a plurality of different values indicating an out-of-service no dial tone condition;
determine a registration state error category associated with the registration state error value, wherein the registration state error category is one of a plurality of registration state error categories each corresponding to one or more possible causes for the out-of-service no dial tone condition and one or more respectively associated possible solutions;
determine a possible cause for the out-of-service no dial tone condition from the one or more possible causes for the out-of-service no dial tone condition associated with the registration state error category;
determine a possible solution associated with the one or more possible causes for the out-of-service no dial tone condition; and
execute instructions associated with the possible solution to attempt to correct the out-of-service no dial tone condition.

18. The non-transitory computer readable storage medium of claim 17, wherein the computer readable storage medium stores further computer readable instructions which, when read by the computer, instruct the computer to:
determine whether the executed instructions are successful in correcting the out-of-service no dial tone condition; and
in response to determining that the executed instructions are not successful in correcting the out-of-service no dial tone condition, transmit a message to a computing device associated with a fix agent,
wherein the message comprises one or more of text data, image data, audio data, and video data, and wherein the message comprises instructions for correcting the out-of-service no dial tone condition.

19. A method comprising:
polling, by a computing device, a plurality of user devices, requesting respective registration state values;
receiving the respective registration state values in response to the polling of the plurality of user devices;
determining an out-of-service no dial tone condition associated with at least one of the respective respective registration state values based on a correspondence of the respective registration state values to registration state error values, wherein each registration state error value is associated with one of a plurality of different values indicating an out-of-service no dial tone condition;
determining a respective registration state error category for each of the at least one of the registration state error values associated with the out-of-service no dial tone condition, wherein the respective registration state error category is one of a plurality of registration state error categories each corresponding to one or more possible solutions for one or more possible causes for the out-of-service no dial tone condition; and
executing instructions to attempt to correct the out-of-service no dial tone condition based on the one or more possible solutions.

20. The method of claim 19, wherein the plurality of registration state error categories comprises at least one Data Over Cable Service Interface Specification (DOCSIS) registration state error category and at least one telephony registration state error category.

21. The method of claim 19, further comprising:
in response to determining that the executed instructions are successful in correcting the out-of-service no dial tone condition, updating a database to indicate that a solution associated with the executed instructions is successful in correcting the out-of-service no dial tone condition.

22. The method of claim 19, further comprising determining a particular possible cause for the out-of-service no dial tone condition, of the one or more possible causes for the out-of-service no dial tone condition, based on account information associated with a user device of the plurality of user devices.

* * * * *

UNITED STATES PATENT AND TRADEMARK OFFICE
CERTIFICATE OF CORRECTION

PATENT NO. : 9,116,801 B2  
APPLICATION NO. : 13/494512  
DATED : August 25, 2015  
INVENTOR(S) : Jeswanth Joel Paul et al.

Page 1 of 1

It is certified that error appears in the above-identified patent and that said Letters Patent is hereby corrected as shown below:

In the Drawings

Sheet 1 of 8, Reference Numeral 15, Figure 1:
  Please delete " 15 " and insert -- 115 --

In the Specification

Column 2, Detailed Description of Embodiments, Line 62:
  Delete "mode" and insert -- modem --

Column 9, Detailed Description of Embodiments, Line 32:
  Delete ""doscis-DataRegComplete"" and insert -- "docsis-DataRegComplete" --

Column 9, Detailed Description of Embodiments, Line 46:
  Delete "IMS 301)" and insert -- IMS 310) --

Signed and Sealed this  
Tenth Day of May, 2016

Michelle K. Lee  
*Director of the United States Patent and Trademark Office*